Sept. 9, 1969 H. W. HAGADORN 3,466,637

MULTITRANSDUCER ARRANGEMENT

Filed Oct. 24, 1965 3 Sheets-Sheet 1

INVENTOR

BY Hubert W. Hagadorn

John J. McCormack

ATTORNEY

INVENTOR
BY Hubert W. Hagadorn
John J. McCormack
ATTORNEY

INVENTOR
BY Hubert W. Hagadorn
John J. McCormack
ATTORNEY

United States Patent Office 3,466,637

Patented Sept. 9, 1969

3,466,637

MULTITRANSDUCER ARRANGEMENT

Hubert W. Hagadorn, Brighton, Mass., assignor to Honeywell Inc., Minneapolis, Minn., a corporation of Delaware Filed Oct. 24, 1965, Ser. No. 504,874
Int. Cl. G11b 5/28
U.S. Cl. 340—174.1 9 Claims

ABSTRACT OF THE DISCLOSURE

A multitransducer magnetic head assembly and method of manufacture thereof. The method includes the bonding of core leg elements in slots in a block of non-magnetic material, forming bonding grooves in a mating surface of the block transversely to the slots, dividing the composite block along a rectilinear axis and folding the divided portions together in a mating relationship, inserting a gap shim between the mated portions and bonding the portions together by means of epoxy material flowed into a bonding recess formed by the matching of the bonding grooves.

The present invention relates to multitransducer magnetic head assemblies for magnetic transcription, especially as adapted for data processing systems. More particularly, the invention is concerned with such assemblies which include multipart, prefabricated casing and transducer core elements which are characterized by a novel casing structure, a novel rigidified, pre-aligned core mounting structure and novel, convenient methods of prefabricating these structures simply, yet accurately.

The manufacture of multitransducer head assemblies has become increasingly complex, especially for data processing applications. Particularly troublesome have been the problems of "gap scatter" and "channel deviation." "Gap scatter" refers to deviations from a prescribed reference axis of the recording gaps (air gaps) of associated transducer cores in a magnetic head assembly. "Channel deviation" refers to deviations from a prescribed gap spacing whereby registry with prescribed recording channels on a medium is imperfect. Scattering and channel deviations are particularly serious in "position-sensitive" types of recording, such as the recording of recording of columnar information in synchronism with a clock track.

In recording systems using a clock track for locating information on parallel record tracks, gap scatter must, of course, be minimal. In situations where the recording media must be operable interchangeably with different recording heads (that is, one channel must read what another channel has written, etc.) the fabrication of the heads must minimize "channel deviations," that is, insure that channels are precisely located, as well as keeping the recording gaps unscattered and aligned along a common gap-axis. Further, in a multitrack head, a degree of coplanarity must also be maintained between the gaps so that azimuth error (that is, deviation of the gap surfaces from a common prescribed plane) can be adequately reduced by angular adjustment of the head. The present invention is directed towards solving these problems.

The increasing demands made by computers upon magnetic head assemblies, such as increased bit densities and the like, have aggravated scattering and deviation problems. This, in turn, has tended to make the fabrication of head assemblies more complicated, requiring that the cores be ever more accurately formed and that they be mounted in a head with greater precision, as well. To meet these demands, workers in the art are commonly turning to structures and fabrication techniques that are disturbingly complex and expensive. The present invention is a step away from this trend, toward the fabrication of simplified structures, by techniques which nonetheless maintain the necessary precision in core dimension and location. Despite their simplicity, magnetic heads made according to the invention have particular advantages in meeting the aforesaid problems of gap scattering and deviation.

More particularly, the invention has provided an especially advantageous method of manufacturing magnetic head sub-assemblies including pairs of similar, symmetrically disposed parts, such as the core legs making up an array of associated transducer cores together with the spacer and bonding parts associated therewith. The invention provides a "core-shoe" for magnetic heads which facilitates a number of fabrication steps on a common fabrication part from which the cores may thereafter be sliced, thus simplifying fabrication, while also providing advantages of matched core structure and accurate core prealignment.

Further, the invention provides such a core shoe comprising an array of aligned, matched pairs of magnetic circuit parts by techniques involving simply slotting a block of spacer material, and bonding regularly-shaped circuit blocks therein so that when the composite block is thereafter cut and fashioned as a unitary whole, it may be halved to form a matched pair of multicore-leg shoe pieces, adapted for mating together with ease, yet with precision. The invention further prescribes novel, advantageous spacer block material together with a novel bonding arrangement for the shoe pieces. It is a salient feature of the invention that the above-described slotting may be simply performed by shallow, rectilinear machining cuts which, besides their convenience, are accurate enough to very precisely locate the core legs and associated bonding material. The result is an inexpensive, yet precisely dimensioned multicore head structure. A single head-slot serves to locate one or more cores for a given recording channel. Thus, track-width errors resulting from misalignment between cores are minimized because errors in slot-center-line location are cancelled.

A single T-shaped core can be inserted in a slot. Unless a core fits tightly in the slot, an additional centerline error results because of clearances between the core and slot whereby the core is not always centered therein (lateral wiggle). This is overcome according to the invention by using a single core block for generating pairs of core legs slotting the block down the center. Thus, the pole faces of the legs are automatically centered upon one another, minimizing "track-width errors" due to pole-face misalignment.

A novel method of epoxy bonding a pair of ceramic shoe-pieces on end to maintain flatness of mating surfaces thereof is also provided according to the invention. Flatness on the order of tens of millionths (required for flying heads) is achieved by slotting shoe-pieces at their intended juncture, lapping the mating surfaces to a flatness of tens of millionths and then abutting them together with epoxy forced into a cavity at their juncture, this cavity being formed from slots in the abutting faces. The strength, accuracy and rigidity resulting from such a simple bond is surprising.

These bonding slots advantageously serve three functions: according to the invention, i.e.: (a) they dimension the gap heights so as to be equal for all cores in a given head, dispensing with the need for individual channel-output compensation adjustments; (b) they provide clearance for inserting an air-gap spacer thus increasing reliability of gap-dimension control; and (c) they provide a bonding annulus common to all core legs for securing the face plate (i.e. core shoe) halves together.

The present invention finds great utility in the fabrication of magnetic head assemblies having annular ferrite transducer cores. An annular core will be understood as one comprising one or more magnetizable circuit pieces adapted, when assembled, to surround an internal core-receiving annulus. A ferrite core will be understood as comprising sintered ferromagnetic oxide material, preferably of high density. Such ferrite material characteristically comprises a major portion of ferric oxide, (about 50% $Fe_2O_3$ or similar ferromagnetic material); a lesser amount of zinc oxide (ZnO); a very minor portion of silicate ($SiO_2$) and the balance either manganese oxide (MnO), nickel oxide (NiO) or the like.

It will become apparent to those skilled in the art that these methods for fabricating shoe-pieces also advantageously provide techniques for forming and finishing transducer core pieces "in situ," that is, as embedded and positioned in their intended casing structure, rather than prior to insertion therein, thus providing convenience of handling, forming, etc.

The foregoing and other characteristic features of novelty are pointed out with particularity in the claims annexed hereto and form a part of the present specification. For a better understanding of the invention, its advantages and specific objects attained with its use, reference should also be had to the accompanying drawings and related descriptive matter wherein preferred embodiments of the invention are clearly described sufficiently to enable one skilled in the art to make and use it.

Referring to the drawings, wherein like reference numerals denote like parts:

Figures 1, 2:
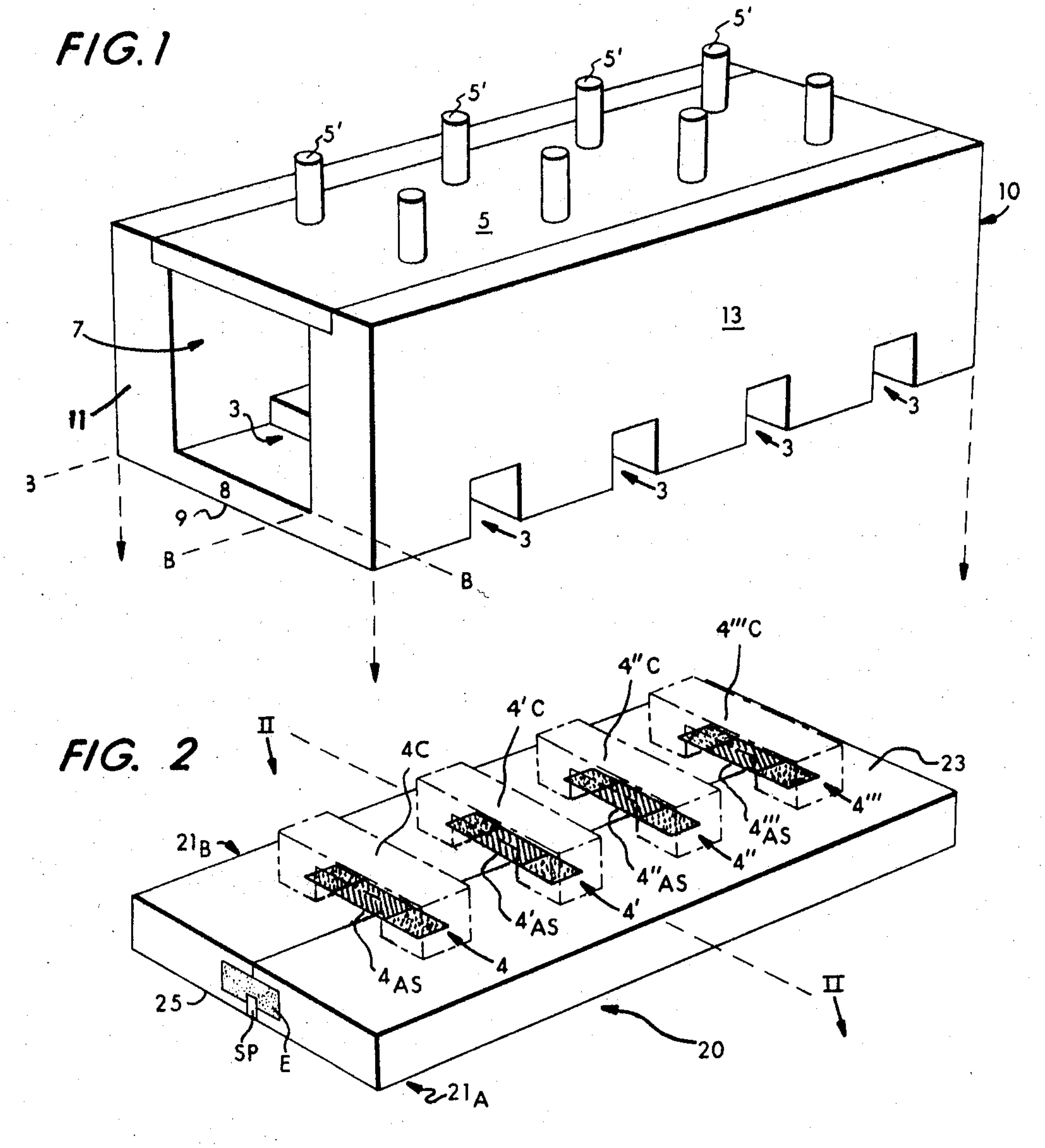
FIGURE 1 is a side perspective view, somewhat exploded, of a preferred embodiment of the invention as employed in a multitransducer magnetic head assembly.
FIGURE 2 is a sectional view along lines II—II of a portion of FIGURE 1, with exemplary core piece 4′ shown therein.

Referring to FIGURES 1 and 2, it will be apparent that there is shown an embodiment of a finished multi-channel (multitransducer core) magnetic recording head 1, comprising an upper, U-shaped portion or casing 10 and a lower pole-shoe portion or face plate 20, intended for bonding with casing 10, but, for clarity, shown exploded away therefrom. It will be understood that this showing is schematic and not representative of exact proportions or dimensions, some parts being exaggerated or highlighted for purposes of clarity.

Being U-shaped, upper casing 10 includes a central cavity 7 defined by a pair of sidewalls 11, 13 connected by a base 8, cavity 7 being closed at the top by terminal board 5. Upper casing 10 comprises a rigid non-magnetic material, preferably a "substantially pure alumina" ceramic having high (95–100%) density and extremely low porosity. The inner surface of base 8 defines a reference plane B—B, while the other surface thereof comprises a mating face 9, adapted to be bonded with a top face 23 of face plate 20. Plate 20 is adapted to contain a plurality of matched ferrite transducer cores 4, 4′, 4″ etc. in prescribed relation. Cores 4, 4′ etc. are three-piece, preferably, being each comprised of identical core-leg portions ($4_A$, $4_B$–$4'_A$, $4'_B$ etc.) and leg-connecting core-yoke portions ($4_C$–$4'_C$–$4''_C$ etc.). Record confronting portions protrude from a recording surface portion 25 of face plate 20 as is conventional. Face 9 is polished and otherwise adapted for bonding to face 23 and also includes a plurality of identical, parallel, slotted channels 3, cut therein to a shallow depth, merely sufficient to communicate with cavity 7, that is, to intersect base plane B—B. The number, width and location of channels 3 are determined according to the recording channels on the intended record media to be operated upon. As seen below, channels 3 are preferably slotted rectilinearly, such as by shallow machining cuts and are somewhat wider than the channel-width, being wide enough to surround upstanding core yokes 4C, 4′C, etc. In cases where yokes 4C etc. do not protrude sufficiently above base 8, channels 3 may be made sufficiently wide to accommodate the windings thereon. Core yokes 4C, 4′C, etc., indicated in phantom, will be seen to conventionally serve to complete the magnetic circuit between associated core legs (4A, 4′A–4B, 4′B etc.). Although the yokes may be attached to face plate 20 and plate 20 then bonded to the face 9 rigidly with yokes 4C etc. fitting loosely into associated channels 3, it is a feature of the invention that these yokes may be attached after this bonding process.

That is, where recording surface 25 must be finished to a high flatness, it is necessary to finish mating surfaces 9, 23 to precise flatness as well as surface 25. This is primarily because discontinuities in the mating relation of surfaces 9, 23 will, after bonding thereof, be transformed into stresses which will disturb the flatness of surface 25. Thus, faces 9 and 23 may be lapped and polished to identical flatness so that they may be wrung together, that is abutted intimately by sliding one surface back and forth over the other under high pressure (removing dust, surface discontinuities etc.). Faces 9, 23 are then bonded, as by dabs of epoxy across their juncture. One may thereafter secure upper casing 10 to face plate 20 permanently by applying epoxy therebetween, such as along the bottom sides of channels 3. Thereafter, yokes 4C, 4′C may be inserted through cavity 7 to be fitted locatingly into appropriate channels 3 and abutted against the ends of appropriate core leg pairs (4A, 4B etc.). Then, the recording face 25 may be lapped and polished to the required flatness with casing portions 10, 20 very rigidly secured together in prescribed flat relation. Of course, where desired, yokes 4C, etc. may be attached to face plate 20 prior to bonding plate 20 to casing 10, although this will usually be less convenient and can disturb flatness. The above arrangement has been seen to provide surface flatness to within three bands (necessary for flying head design) as well as accurately controlling gap height and gap length and minimizing scatter—despite its convenience.

If, on the other hand, extreme flatness is not necessary, a thin layer of epoxy may be applied to the surface 9 and pole shoe face 23 then bonded thereto after which surface 25 may be lapped and polished. Such an intermediate epoxy layer is avoided where recording face 25 must be extremely flat, since temperature variations, aging etc. can so stress the epoxy as to deform recording surface 25, upsetting its flatness. With plate 20, bonded to casing 10, it will be apparent that the wound core portions or yokes, 4C etc. may intrude sufficiently into cavity 7 so that the windings may be connected to associated connector pins 5, 5′ on terminal board 5 bonded to casing sidewalls 11, 13, as known in the art. With the leads thus connected, a flexible potting material may then be inserted to fill the balance of cavity 7, flexibly bonding the wound core portions and associated leads therein and protecting them from exposure to moisture, dust and the like.

The face plate or, pole shoe, 20 actually comprises a multicore assembly which, as indicated sectionally in FIGURE 2, takes the form of a pair of like shoe halves 21A, 21B. Pole shoe halves 21A, 21B are held rigidly together by a bond E, running along the juncture thereof with a gap-spacer shim SP interposed therebetween. Each shoe half 21A, 21B has embedded therein a plurality of identical aligned core legs (or magnetic circuit parts) along slotted portions thereof and arranged to be magnetically connected for transcription operation by associated wound yoke portions 4C, 4′C etc., as known in the art. Yokes 4′C etc. are bonded, such as by epoxy beads 41 (FIGURE 2) into intimate, low-reluctance contact with associated core legs 4′A, 4′B etc., preferably in overlapped relation, as shown. Thus, associated magnetic parts 4A, 4B, 4C–4′A, 4′B, 4′C, 5, etc., being arranged to form three-piece transducer cores 4, 4′ etc., have a number, dimension and positioning which are somewhat arbitrary, being shown in exemplary fashion only. Cores 4, 4′ etc. are precisely dimensioned and exactly located in the non-magnetic casing halves 21A, 21B of shoe 20, being exactly positioned therein at track-defining slot locations in this non-magnetic matrix. The preferred method whereby shoe-sections 21A, 21B are fabricated according to the invention is explained below relative the description of FIGURES 3, 4, and alternate embodiments in FIGURES 5 and 6. When bonded together, shoe sections 21A, 21B form a rigid, relatively flat plate having yokes 4C, 4′C, etc. secured on the mating face 23 thereof for intrusion through upper casing 10 and having recording face 25 thereof contoured and finished for transcribing confrontation with magnetic record media as is known.

As seen in FIGURE 2 (for exemplary core 4′), each core comprises a wound section (4′C) magnetically connecting a pair of core legs (4′B, 4′A) which happen to be identical and symmetrically disposed in confronting relation about a very thin strip of spacer material SP as known in the art. As will appear more clearly relative to FIGURES 3–6 below, the core legs (4′B, 4′A) surround an annulus, in which is located a pair of non-magnetic filler portions 4′BS, 4′AS which, in turn, surround an inner annulus filled by a common bonding material (4′E, a section of bonding plug E in FIGURE 1). Bond E is adapted to bond the filler and associated leg sections so as to draw shoe sections 21A and 21B into intimate rigid engagement as indicated below. A feature of the invention is that bond E is therefore arranged to draw shoe halves 21A, 21B so tightly against spacer SP as to place the spacer-engaging portions thereof under compression and thus forming a rigid, durable unit. It is found that the ferrite material of legs (4′B, 4′A) is especially strong in compression and thus can be made to resist the tendency of the exposed edges of the core legs to crumble under wear. This may be done by the shrinkage of bond E, as described below. To accommodate this, shim strip SP is preferably somewhat compressible, comprising a non-magnetic metal strip preferably of Havar, a high-cobalt, hard steel alloy, found to give superior gap-definition, toughness, and the like. Strip SP will be as long as shoe 20 and as thin as the prescribed "air-gap" dimensions. The casing material 21 (see FIGURE 4) making up the non-magnetic matrix of shoe sections 21A, 21B comprises, preferably, the same material as that of upper casing 10, that is, a high-density pure alumina ceramic as described above. The core circuit parts (e.g. parts 4′A, 4′B, 4′C of core 4′) comprise preferably a high density ferrite material as described above.

Referring now to FIGURES 3–6, a preferred method of fabricating pole shoe, or face plate, 20 according to the invention will be described. Referring especially to FIGURE 3A, a block 20′ (or shoe-profile) of spacer material is formed to assume a relatively flat-sided, orthogonal parallelepiped, the top side 29 thereof being lapped carefully to a flat finish. According to a feature of the invention, a plurality of, identical, rectilinear, shallow core-receiving channels SL are then slotted parallel across top face 29. The number spacing and width of channels SL is, of course, determined by the corresponding number and characteristics of the contemplated recording channels of the magnetic media and will be determined accordingly. Channels SL are each adapted to receive an associated, core-leg-block or profile 4AB, 4′AB etc. Profiles 4AB, etc. each comprise relatively T-shaped blocks of ferrite material adapted to be cut to form pairs of core legs, such as core legs 4B, 4A in FIGURE 4; legs 4′A, 4′B in FIGURE 2 etc. Channels SL are cut to a prescribed shallow depth approximately corresponding to the height DD of profiles 4AB etc., or alternatively slightly less than this to allow the top faces of the profiles to protrude slightly above face 29 as described below. Channels SL are dimensioned to snugly receive profiles 4AB etc., having a similar length to that of the profiles and a width corresponding to the thickness H thereof. One profile is, of course, inserted in each of the channels SL to have end faces 45, 45′ etc. thereof co-extensive with the sides of casing block 20′ (as indicated in FIGURE 3A) and also to have the top surfaces 41, 41′ etc. thereof flush with block face 29, or protruding slightly thereabove. It may be convenient for jigging purposes to allow the profiles to protrude slightly above associated channels so that top surfaces 41 etc. conveniently provide purchase for depressing the profiles to seat them filmly at the bottom of the channels. Since the profiles may conveniently be epoxy-bonded to the bottom of associated channels SL, and since the epoxy material layer between the profile and the casing 21 should be of minimum thickness of magnetic and mechanical (e.g. rigidity) purposes, it is useful to depress the profile to reduce this epoxy layer. The epoxy film will, of course, fill gaps between the profiles and associated channel surfaces, e.g. due to surface voids or to a slight radius, or concavity, along the bottom of the channels which sometimes results from the channeling operation.

With profiles 4AB etc. thus secured in shoe-profile 20′, a bonding filler such as hardenable epoxy resin, may then be poured into the channels SL about the profiles to fill the channels to be substantially flush with the exterior of profile block 21. This resin material thus forms non-magnetic spacer portions in each channel, such as indicated at 4′AS, 4′BS and at 4BS, 4AS in FIGURES 2 and 4, respectively, and will act to bond the profiles in channels SL as well as fill around them. Some of this filler material can likely enter the miniscule gaps between profiles 4AB etc. and the sides of their respective channels SL (for instance, by capillary action) to fill them and more securely bond the profiles therein. In order to promote this bond and also to eliminate air bubbles and other voids in the filler which can weaken the bond, it is preferred to outgas the filler. This may be accomplished by injecting the epoxy filler material in the presence of a vacuum, such as by pouring and hardening it inside an evacuated bell jar. The vacuum will also advantageously draw filler material down around the profile to strengthen the bond thereof to the sides of channels SL. In this way, it will be evident that the profiles are secured in spacer piece 20′ so that the top faces 41, 41′ etc. thereof will be aligned relatively centrally of channels SL to be relatively coplanar with top face 29 or able to be readily finished so.

Figures 3A, 3B:
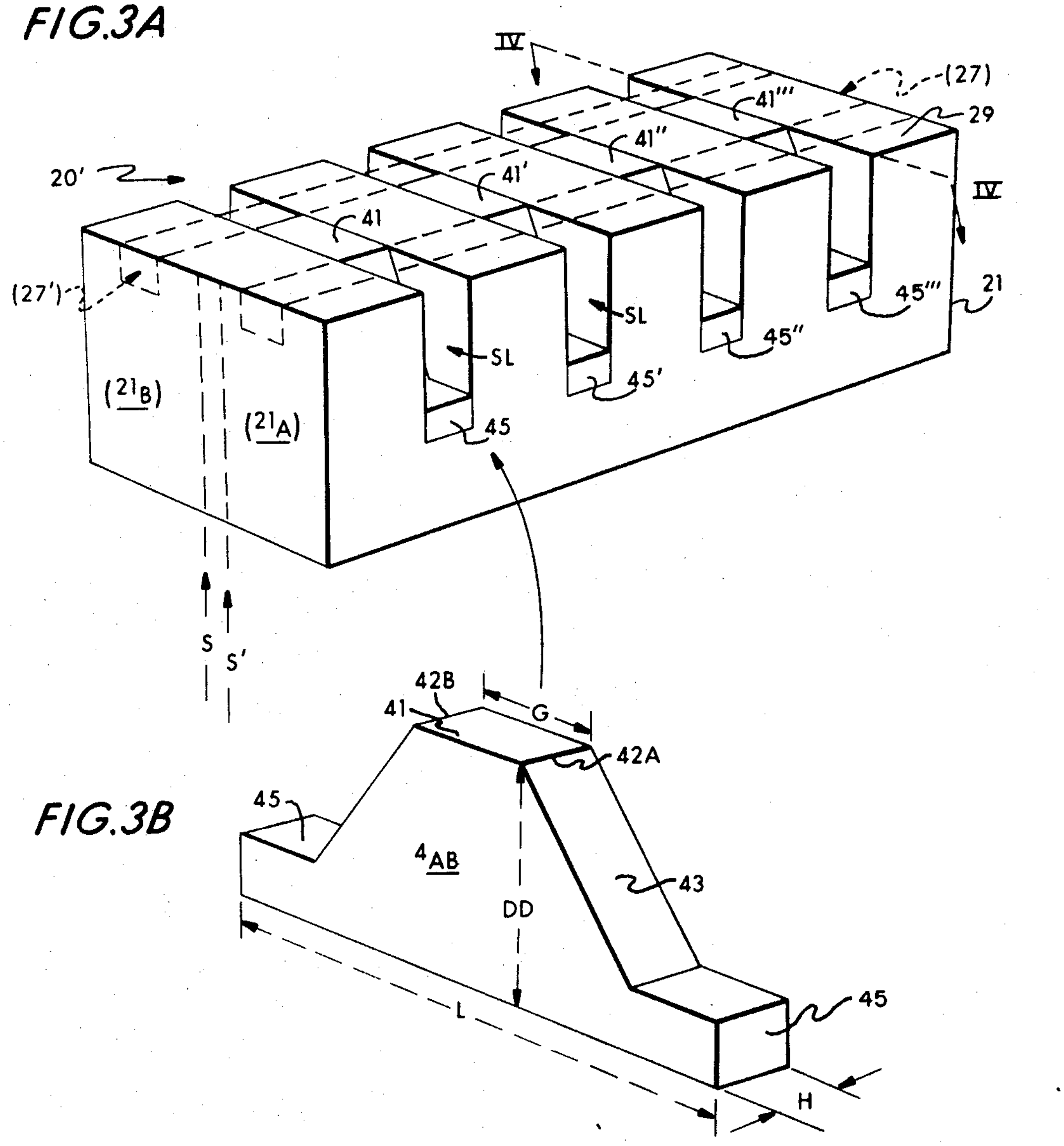
FIGURE 3A is a perspetcive, somewhat schematic view of a composite head-fabrication part from which the array of encased cores in FIGURES 1 and 2 may be fabricated in common according to the invention.
FIGURE 3B is a perspective view of one of the core-fabrication parts apt for insertion in the head-fabrication part of FIGURE 3 as indicated, to form a pair of core-legs according to the invention.
Figure 4:
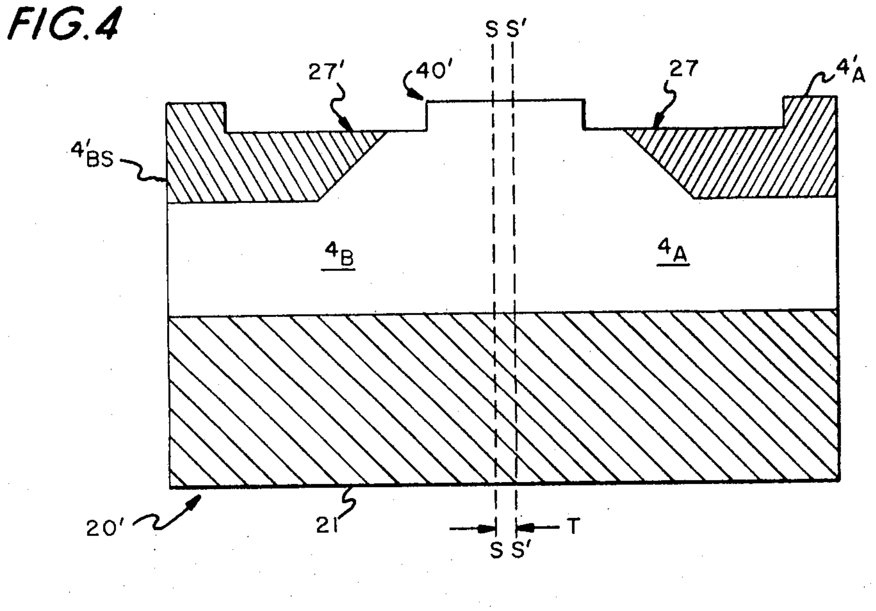
FIGURE 4 is a sectional view along lines IV—IV of FIGURE 3A.

According to another feature of the invention, a second slotting operation may now be performed on shoe-piece 20′ to provide a pair of "bonding slots" 27, 27′ as indicated in FIGURES 4 and 3A (in phantom). As will be seen more clearly hereinafter, slots 27, 27′ cooperate to form a single bonding cavity for the bonding slug E; and also provide an advantageous trimming of profile top surfaces 41, 41′ etc., thereby matching core dimensions and alignment. This trimming is related to the "gap-height" dimension GG of the core profiles (indicated in FIGURE 3A) and is prescribed to leave profile top 41 somewhat more than twice the length G of the core gap-height (FIGURE 2). Thus, when block 20′ is halved, the remaining portion of length GG will be twice the gap height G, thus providing identical, confronting core faces matched in dimensions and edge alignment; thus, matching the inductance and output characteristics thereof also. Gap height G will be recognized by those skilled in the art to be relatively critical, affecting recording characteristics which should be matched for associated cores. The trimming is a more accurate and convenient way to thus match the core faces, being more convenient than prefabricating them individually, for instance.

Trimming slots 27, 27′ may therefore comprise simple, convenient (though accurate) cutting operations, such as by shallow rectilinear machining cuts across face 29 through the ferrite profile material and adjacent epoxy filler material in channels SL and through the material of casing 21, as indicated sectionally in FIGURE 4. Slots 27, 27′ are arranged to have a depth sufficient to provide adequate width for bonding plug E.

The unitary composite spacer shoe-piece 20′ is now ready for halving according to the invention to form two symmetrical, identical shoe halves 21A, 21B, as indicated in phantom in FIGURE 3A, and as shown, folded over and bonded together in FIGURES 1 and 2. This halving may be simply provided by slicing along parallel cutting lines S, S′ as indicated in FIGURES 3A and 4. It will be evident that this simple slicing operation is done precisely centrally of profiles 4AB etc. to form the identical halves. It will be apparent that such a slicing operation will provide a cut having a finite width T, the dimension of the cutting tool, and thus remove some of the material sectionally from profiles 4AB etc., accordingly reducing length GG of top profile faces 41, etc. Thus, length GG should be sufficiently large to accommodate this removal of material as well as the above-mentioned trimming operation (along slots 27, 27′) to yield the gap-height dimension (twice G) mentioned above.

It will be evident that shoe sections 21A, 21B may now be folded together so that associated core legs (e.g. 4′A, 4′B) confront one another in mirror-image relation, with the identical gap-forming faces thereof separated by thin shim SP to form the finished face plate 20 of FIGURES 1 and 2. Thus, sections 21A, 21B may be jigged, or otherwise secured together, with spacer shim SP held therebetween, while a mass of bonding material is poured into the symmetrical channel formed by trim slots 27, 27′, now in registry, to harden and thus form bonding plug E. The adhesive material preferably comprises an epoxy resin arranged to bond securely with the ceramic material of spacer block 21 and to be cured with a slight shrinkage so as to place confronting core faces in proper compression about shim SP, as indicated above, for instance, by heat-cycling during curing.

Face plate 20 has now been fabricated and may be finished as a whole on various surfaces thereof. For instance, top face 23 may be finished for mating engagement with face 9 of casing 10 by polishing etc. while recording face 25 may be finally contoured, etc. Ferrite yoke portions 4C, 4C′ etc. may now be bonded to top 23 although preferably top 23 is first secured (wrung) to face 9 of casing 10; after which yokes 4C having been appropriately wound, may more conveniently be affixed thereon, being located by channels 3. It will be apparent that it is more advantageous to so attach yokes 4C etc. after shoe 20 has been bonded to casing 10, since channels 3 may be used to assist in locating and supporting the yokes and in "potting" them in place, since the bonding material applied to the yokes may be used to fill the remainder of channels 3, bonding the ferrite and casing materials more securely therein.

The above-described novel "half-construction" design and procedures whereby ceramic casing materials are slotted to locate ferrite cores and whereby a composite casing/core block (or shoe profile) is finished and halved to form core sections by common finishing strokes, and thus generate a matched transducer array (the face plate), is new and highly useful in the art. It will be apparent that the shallow machining operations forming the slots are simple and convenient to perform, as is the halving operation which forms mating core-array sections. Similarly, the prefabrication of a core/matrix array is advantageous, lending itself to accurate matching of cores and to the employment of convenient common finishing operations, both before and after bonding the block to an upper casing member. Such finishing steps are common to all the cores therein and help to match their characteristics, (such as the dimensions and alignment); facilitate lapping the array to improve gap definition, and the like. Further, such a "half-construction" is more convenient to work with; for instance, the record-confronting face 25 of shoe 20 may be finished and polished as an integral unit to a given contour and flatness, a procedure which is more convenient and reliably accurate than pre-finishing faces of the core legs and of the spacer block separately. It is further found that bonding plug E is able to maintain shoe sections 21A, 21B in firm rigid engagement with surprising effectiveness, such as during polishing and finishing despite the high stresses imposed thereby, despite its relatively small cross-sectional size.

Workers in the art will recognize that the invention may be practiced with structures and steps equivalent to those indicated above. For instance, where ferrite profiles 4AB etc. have been indicated as relatively T-shaped before insertion into shoe-profile 20′, they may be formed otherwise, for instance, using the common slotting techniques taught elsewhere herein. For instance, profiles 4AB etc. may, at times, be inserted into channels SL as rectangular plates dimensioned to substantially exactly fill their respective channels and the annular portions of the core legs be formed by common rectilinear slots machined therein, for instance, by extending slots 27, 27′ in FIGURE 3 outwardly towards the sides 45, 45′ etc. of the profiles. Thereafter, the excess ceramic material removed from block 21 may be replaced with the same epoxy used to fill the remainder of channels SL.

Figure 5:
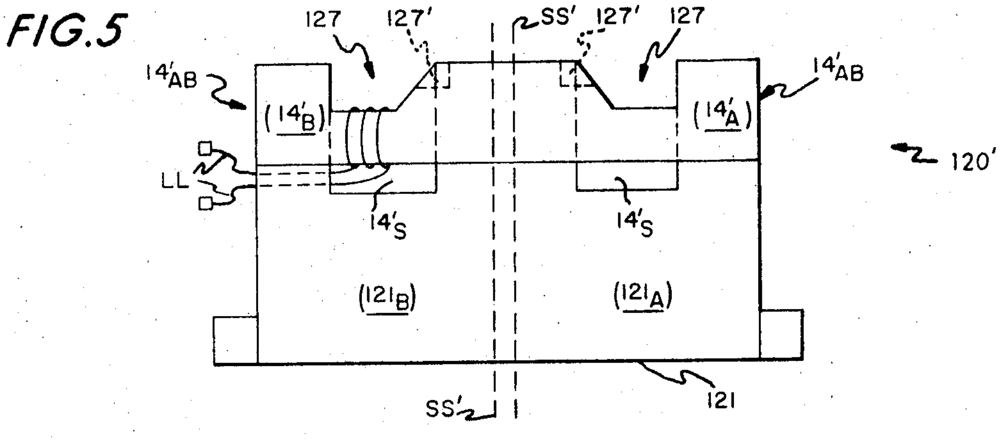
FIGURE 5 is a sectional view similar to FIGURE 4, illustrating an embodiment alternate thereto.

Such a ferrite-profile-slotting operation might also be performed, in situ, to form "annulus-cavities" 127 of the two half sections shown in the alternative embodiment of FIGURE 5. FIGURE 5 will be seen to represent the same kind of face-plate-forming shoe-profile 120′, as was indicated by profile 20′ in FIGURE 4, with the following modifications however. Ceramic shoe casing 121 is substantially the same except for having an additional set of slots 14′S transverse to core-locating channels SL and arranged to subtend the annulus-cavities of the profiles 14′AB etc., extending slightly therebelow to accommodate at least one set of core windings LL. The leads for windings LL may be introduced along channels SL, for instance, along the concave central bottom thereof, prior to the hardening of the epoxy adhesive material therein. In this case alternate profiles 14′ may either be pre-formed to include symmetrical pairs of mating annulus-cavities 127 before insertion and bonding in channels SL; or, as indicated above, be inserted as rectangular pieces with cavities 127 being machined "in situ" by common slotting strokes. It will be seen that cores 14′ comprise a 2-piece construction, as opposed to the 3-piece construction shown in FIGURES 1–4. Then, trimming slots 127′ may be cut in the manner of trim slots 27, 27′ (FIGURE 3A), with cavities 127 either being epoxy filled prior thereto or filled thereafter, with the same material as for plug E. With two symmetrical C-shaped halves thus formed, composite profile 120′ may now be halved along slicing lines SS′ to form a composite face plate 120 (not shown) of two-piece core transducers, matched to one another and adapted for use either alone or in connection with a receiving piece, such as casing 10 in FIGURE 1.

Figure 6:
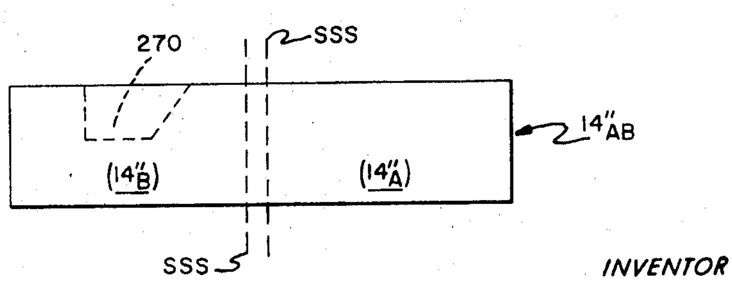
FIGURE 6 is a schematic view similar to FIGURE 5 showing another alternate embodiment.

A further modification of the above-indicated face plates 20′ and 120′ and associated profiles (4AB etc. and 14′AB etc. respectively) is indicated in FIGURE 6 wherein is shown a third form of a ferrite profile 14″AB, which unlike the foregoing profiles is adapted to form unsymmetrical, rather than symmetrical, core legs (14"A, 14"B). Such an array of asymmetrical two-piece transducers is at times desirable in the art, for instance, to provide an "offset" gap, such as used with flying disk records. In such a "C–I" core arrangement, it will be apparent that only a single, annulus-creating cavity 270 (indicated in phantom) need be provided. It will be apparent that the embodiment of FIGURES 5 and 6 also suggest "half-type constructions," whether symmetrical or unsymmetrical, the halves being formed in common and folded together to comprise the multicore transducer face plate.

It will be apparent that the above-described fabrication process is novel and advantageous in the art and moreover may be applied to other and different arrangements of embedding multipart cores in a spacer matrix with convenience and yet with precision of location therein. While the invention has been particularly shown and described with reference to the preferred embodiment above, it will be understood by those skilled in the art that changes in form and detail in materials and dimensions and the like may be made and that certain features may be substituted for or deleted without departing from the spirit or scope of the invention.

What is claimed is:

1. An improved multicore magnetic head having a plurality of cores aligned and spaced in prescribed recording channels in a pole shoe, said cores including at least two magnetizable circuit parts of sintered oxidic ferromagnetic material with a gap therebetween filled with a spacer shim, said gaps being arranged to be aligned and coplanar said head comprising:

a pole-shoe formed by shaping and slotting a block of spacer material along a mating face thereof with a plurality of prescribed rectilinear slots; filling each said slot with a double-core-leg profile affixed therein in prescribed alignment; grooving the composite shoe profile thus formed to shape said core leg profiles; finishing said mating surface for flat-bonding; slicing said shoe profile normal to said mating surface; and folding over and bonding the two portions of said mating surface thus formed in confronting relation so that the thus-sectioned portions of said leg profiles are located in magnetic transcribing relation separated by a prescribed transcribing gap.

2. A multitransducer magnetic transcription head comprising:

a plurality of transducer cores, each core comprising a pair of core legs magnetically separated by a gap shim of prescribed reluctance; each of said legs being embedded in one of a pair of slotted non-magnetic casing members, said casing members comprising a pair of half-heads formed from halving a non-magnetic matrix having said core legs embedded in slots therein, in prescribed spacing and alignment; each half-head being arranged on one side of the plane of said gap, said half-heads being bonded abuttingly along said gap plane to define unscattered aligned core gaps along a common recording plane.

3. A multichannel magnetic transcription device comprising a pair of slotted casing halves, the slots therein being filled with aligned circuit parts, said halves being sliced from a common block, then being rotated toward one another 90° and abutted in confronting relation with a spacer gap shim therebetween so that said circuit parts are confrontingly paired in aligned transcribing relation.

4. The combination as recited in claim 3 wherein said casing halves each comprise a non-magnetic matrix of high density, substantially pure alumina embedding said circuit parts, said circuit parts comprising a ferrite of substantially zero porosity.

5. A method manufacturing a multicore magnetic head assembly, each core therein including a pair of magnetizable leg portions, said cores being spaced and aligned relative one another to align transducer gaps thereon along respective prescribed recording channel axes, said method comprising the steps of:

forming a rectilinear block of non-magnetic spacer material to a prescribed spacer profile;

forming a plurality of identical core-leg profiles, corresponding to pairs of said core legs as folded and joined together into a unitary blank adapted for halving;

cutting a plurality of identical rectilinear slots in a mating surface of said block along said channel axes, each of said slots being dimensioned to receive one of said core-leg profiles;

bonding said core-leg profiles in said slots in gap-aligned relation;

filling said slots with a non-magnetic bonding material to the level of said spacer profile;

finishing the composite spacer block and core legs embedded therein unitarily;

shaping rectilinear bonding grooves in said mating surface of said block transversely to said channel axes to shape said profiles to a prescribed pattern;

rectilinearly halving said block to form twinned mating half-heads;

folding said half-heads together in aligned mating relationship whereby associated ones of said legs are disposed in confronting alignment and said bonding grooves are disposed in communicating relation to form at least one bonding recess;

inserting a spacer gap shim between said mating half-heads along a predetermined line; and bonding said twinned half-heads together solely by means of adhesive material in said bonding recess.

6. A method of manufacturing pole shoe assemblies for magnetic heads having a plurality of tranducers aligned along respective, prescribed recording channel axes, said method comprising the steps of:

forming a rectilinear block of magnetic material to a predetermined spacer profile;

forming a plurality of core-leg profiles, corresponding to pairs of core-legs as folded and joined together into a unitary blank adapted for division;

cutting a plurality of rectilinear slots along a mating surface of said block along said channel axes, each of said slots being dimensioned to receive one of said core-leg elements;

bonding said core-leg profiles in corresponding slots in gap-aligned relationship;

shaping bonding grooves in said mating surface of said block transversely to said channel axes;

rectilinearly dividing said block to form mating head portions;

folding said head portions together in aligned mating relationship whereby associated ones of said legs are disposed in confronting alignment and said bonding grooves are disposed in communicating relation to form at least one bonding recess;

inserting a spacer gap strip between the mating head portions; and bonding said mating portions together by means of adhesive material retained in said bonding recess.

7. A method as described in claim 6 wherein said bonding grooves are formed with a predetermined shape to finish said core-leg profiles to a prescribed pattern.

8. A method as described in claim 5 which includes selecting an epoxy adhesive material:

vacuum pulling said adhesive material around each of said core-leg profiles to fill said slots and bond said core-leg profiles therein without discontinuities; and hardening said material in place.

9. A method as described in claim 5 wherein two identical bonding grooves are formed, having a predetermined shape to trim the configuration of said core-leg profiles to prescribed dimensions, and said bonding grooves are filled with an epoxy material.

(References on following page)

References Cited

UNITED STATES PATENTS

| | | | |
|---|---|---|---|
| 2,943,384 | 7/1960 | Wisner | 29—603 |
| 3,042,999 | 7/1962 | Page et al. | 29—603 |
| 3,105,286 | 10/1963 | Duinker et al. | 29—603 |
| 3,224,073 | 12/1965 | Peloscher | 29—603 |
| 3,242,556 | 3/1966 | Broughton | 29—603 |
| 3,327,313 | 6/1967 | Oliver | 346—74 |
| 3,353,261 | 11/1967 | Bradford | 29—603 |
| 3,369,292 | 2/1968 | Manders | 29—603 |
| 3,391,453 | 7/1968 | Merz | 29—603 |

TERRELL W. FEARS, Primary Examiner

V. P. CANNEY, Assistant Examiner

U.S. Cl. X.R.

29—603